(12) United States Patent
Zhang

(10) Patent No.: US 12,126,664 B2
(45) Date of Patent: Oct. 22, 2024

(54) DATA DOWNLOAD METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Hui Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/077,665

(22) Filed: Dec. 8, 2022

(65) Prior Publication Data

US 2023/0107093 A1    Apr. 6, 2023

Related U.S. Application Data

(63) Continuation of application No. PCT/CN2022/085776, filed on Apr. 8, 2022.

(30) Foreign Application Priority Data

May 17, 2021   (CN) .......................... 202110531639.2

(51) Int. Cl.
*H04L 65/61*       (2022.01)
*H04L 65/75*       (2022.01)

(52) U.S. Cl.
CPC ............ *H04L 65/61* (2022.05); *H04L 65/765* (2022.05)

(58) Field of Classification Search
CPC ..... H04L 65/61; H04L 65/765; H04L 65/612; H04L 65/80; H04L 67/06; H04N 21/238;

(Continued)

(56) References Cited

U.S. PATENT DOCUMENTS

| 9,065,846 | B2 * | 6/2015 | Mahaffey | ............ H04L 63/1408 |
| 2007/0043874 | A1 * | 2/2007 | Nath | ........................ H04L 67/06 709/230 |

(Continued)

FOREIGN PATENT DOCUMENTS

| CN | 101437044 A | 5/2009 |
| CN | 111447265 A | 7/2020 |

(Continued)

OTHER PUBLICATIONS

The World Intellectual Property Organization (WIPO) International Search Report for PCT/CN2022/085776 Jun. 28, 2022 7 Pages (including translation).

(Continued)

*Primary Examiner* — Suraj M Joshi
*Assistant Examiner* — Jaren Means
(74) *Attorney, Agent, or Firm* — ANOVA LAW GROUP, PLLC

(57) ABSTRACT

A data download method, performed by a computer device. The method includes querying fog node information of a fog node corresponding to target data upon receiving a data download request for the target data, the fog node information comprising a communication protocol type of the fog node; identifying a target fog node from the fog node based on the fog node information; slicing the target data to be downloaded according to the communication protocol type of the target fog node to obtain slice information of a data slice to be downloaded; transmitting a slice download request to the target fog node corresponding to the data slice to be downloaded based on the slice information of the data slice to be downloaded; and obtaining the target data by combining the data slice returned by each target fog node in response to the corresponding slice download request.

20 Claims, 9 Drawing Sheets

(58) Field of Classification Search
CPC ........... H04N 21/23106; H04N 21/438; H04N 21/643; H04N 21/8456
See application file for complete search history.

(56) References Cited

U.S. PATENT DOCUMENTS

| | | |
|---|---|---|
| 2017/0277574 A1 | 9/2017 | Anami |
| 2018/0150353 A1 | 5/2018 | Gladwin et al. |
| 2019/0036648 A1 | 1/2019 | Yanovsky et al. |
| 2022/0361081 A1* | 11/2022 | Shekhar ............... H04W 72/51 |
| 2023/0010046 A1 | 1/2023 | Yan |

FOREIGN PATENT DOCUMENTS

| | | |
|---|---|---|
| CN | 111629075 A | 9/2020 |
| CN | 111629075 B | 12/2020 |
| CN | 112073542 A | 12/2020 |
| CN | 112954406 A | 6/2021 |
| IN | 111182331 A | 5/2020 |
| WO | 2016043120 A1 | 3/2016 |

OTHER PUBLICATIONS

The European Patent Office (EPO) The Extended European Search Report for 22803686.9 Jan. 4, 2024 10 Pages.
The Japan Patent Office (JPO) Notification of Reasons for Refusal for Application No. 2023-526436 and Translation Apr. 22, 2024 6 Pages.

\* cited by examiner

DATA DOWNLOAD METHOD AND APPARATUS, COMPUTER DEVICE, AND STORAGE MEDIUM

RELATED APPLICATIONS

This application is a continuation of PCT Application No. PCT/CN2022/085776, which in turn claims priority to Chinese Patent Application No. 2021105316392, entitled "DATA DOWNLOAD METHOD AND APPARATUS, COMPUTER DEVICE, AND STORAGE MEDIUM" and filed with the China National Intellectual Property Administration on May 17, 2021. The two applications are incorporated herein by reference in their entirety.

FIELD OF THE TECHNOLOGY

This application relates to the field of computer technology, and in particular to a data download method and apparatus, a computer device, and a storage medium.

BACKGROUND OF THE DISCLOSURE

Due to the wide range of applications of various video media platforms, more users choose to watch multimedia through the multimedia platforms. When a user accesses multimedia data, the multimedia platform can download corresponding multimedia resources from the content delivery network and play the multimedia date based on downloaded multimedia data.

However, as the network scale increases, in order to ensure the speed of downloading multimedia data from the content delivery network, a large number of cache servers are required to maintain a sufficient network bandwidth, thereby greatly increasing the bandwidth cost. At present, part of data download pressure is shared primarily by edge devices in the content delivery network to reduce the bandwidth pressure of the content delivery network. However, since different edge devices may employ different communication protocols, there is a need for a data download method that is compatible with different communication protocol types.

SUMMARY

Embodiments of this application provide a data download method and apparatus, a computer device, a storage medium, and a computer program product.

One aspect of the present disclosure provides a data download method. The method includes querying fog node information of a fog node corresponding to target data upon receiving a data download request for the target data, the fog node information comprising a communication protocol type of the fog node; identifying a target fog node from the fog node based on the fog node information; slicing the target data to be downloaded according to the communication protocol type of the target fog node to obtain slice information of a data slice to be downloaded; transmitting a slice download request to the target fog node corresponding to the data slice to be downloaded based on the slice information of the data slice to be downloaded; and obtaining the target data by combining the data slice returned by each target fog node in response to the corresponding slice download request.

Another aspect of the present disclosure provides a computer device, including a memory and a processor, the memory storing a computer program, the processor, when executing the computer program, implementing a data download method. The method includes querying fog node information of a fog node corresponding to target data upon receiving a data download request for the target data, the fog node information comprising a communication protocol type of the fog node; identifying a target fog node from the fog node based on the fog node information; slicing the target data to be downloaded according to the communication protocol type of the target fog node to obtain slice information of a data slice to be downloaded; transmitting a slice download request to the target fog node corresponding to the data slice to be downloaded based on the slice information of the data slice to be downloaded; and obtaining the target data by combining the data slice returned by each target fog node in response to the corresponding slice download request.

Another aspect of the present disclosure provides a non-transitory computer-readable storage medium is provided, storing a computer program, the computer program, when executed by a processor, implementing a data download method. The method includes querying fog node information of a fog node corresponding to target data upon receiving a data download request for the target data, the fog node information comprising a communication protocol type of the fog node; identifying a target fog node from the fog node based on the fog node information; slicing the target data to be downloaded according to the communication protocol type of the target fog node to obtain slice information of a data slice to be downloaded; transmitting a slice download request to the target fog node corresponding to the data slice to be downloaded based on the slice information of the data slice to be downloaded; and obtaining the target data by combining the data slice returned by each target fog node in response to the corresponding slice download request.

DESCRIPTION OF EMBODIMENTS

Figure 1:
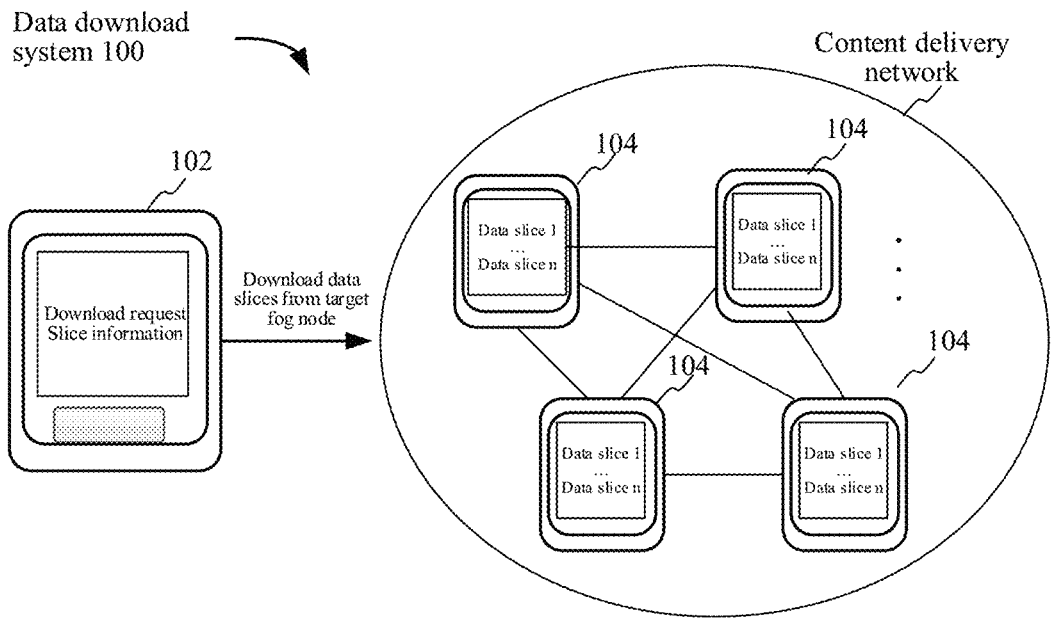
FIG. 1 is an application environment diagram of a data download method in one embodiment.

FIG. 1 is an application environment diagram of a data download method in one embodiment. Referring to FIG. 1, the data download method is applied to a data download system 100. The data download system 100 includes a computer device 102, and fog nodes 104. Upon receiving a data download request for target data, the computer device 102 may select a target fog node from the fog nodes 104 and slice the target data to obtain slice information. The computer device 102 transmits corresponding slice information to the target fog node for the purpose of downloading data slices from the target fog node to obtain the target data. The computer device 102 may be, but is not limited to, various personal computers, notebook computers, smart phones, tablet computers, servers, and portable wearable devices, the fog nodes 104 may be edge devices in a content delivery network, and the edge devices may be routers, or user terminals, etc.

It is to be understood that, the content delivery network can further include a cache server. The cache server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network, and an artificial intelligence platform.

When a user uses the content delivery network (CDN) to download data, the user needs to use one own terminal or server as an edge device to access the CDN, and the edge device has a certain available bandwidth; and therefore, a large number of edge devices with a certain network bandwidth resource are connected in the CDN. At the same time, as the edge device has downloaded part of the data from the CDN, each edge device may have part of the data in a CDN cache server. Therefore, the edge device in the CDN caches data information and has available bandwidth, so that this part of the edge device can be used as a resource provider for downloading data to share the data download pressure of the cache server in the CDN.

The technical solution provided by this application also relates to the technical field of clouds, and in particular to a cloud storage technology in a cloud technology. Cloud storage (cloud storage) is a new concept extended and developed from the concept of cloud computing. The distributed cloud storage system (hereinafter referred to as a storage system) refers to a storage system which integrates a large number of different types of storage devices (storage devices are also referred to as storage nodes) in a network through cluster application, grid technologies and distributed storage file systems and through application software or application interfaces to work together and provide external data storage and service access functions together.

In addition, the technical solution provided by this application also relates to a block chain technology, for example, data slices to be downloaded may be stored in a block chain. A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

Figure 2:
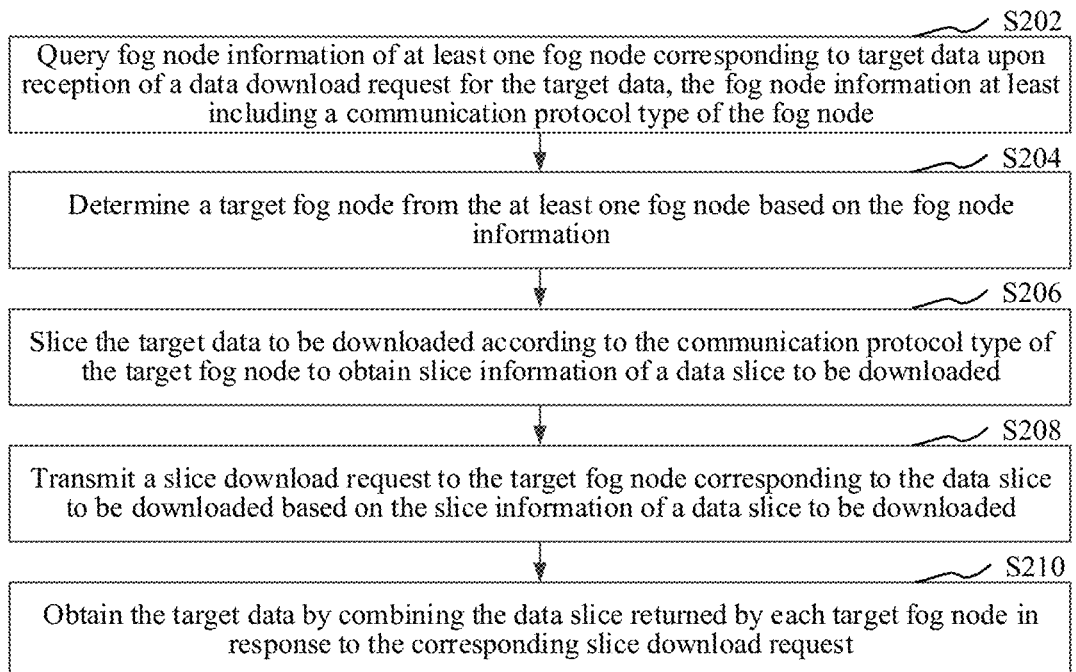
FIG. 2 is a flowchart of a data download method in one embodiment.

In one embodiment, as shown in FIG. 2, a data download method is provided, and the method is illustrated as applied to a computer device 102 in FIG. 1, and the computer device may be a server or a terminal. In order to better understand this application, the following description takes a computer device as a terminal as an example, and the data download method includes the following steps:

S202: Query fog node information of at least one fog node corresponding to target data upon receiving a data download request for the target data, the fog node information at least including a communication protocol type of the fog node.

The fog node refers to an edge device in the CDN, and the edge device refers to a device in the edge network of the CDN. In a particular embodiment, the edge device may be a router or a user terminal in the CDN. Compared to cache servers located in the CDN, fog nodes are typically closer to users and have a large amount of idle, high-quality, low-cost bandwidth. The cache server refers to a server caching data to be downloaded in the content delivery network.

The fog node information refers to information related to the fog node, and may include a device type of the fog node, available resource information, adopted communication protocol types, etc. The device type refers to information reflecting the type of the fog node, for example, the device type of the fog node may be the router or the user terminal, etc. The available resource information refers to information reflecting available computer resources in the fog node, for example, the available resource information may specifically include available bandwidth information and available internal memory information, etc.

The communication protocol type refers to the type of a communication protocol adopted by the fog node, and may specifically include a bilateral reliable communication protocol type and a connectionless communication protocol type, etc. The bilateral reliable communication protocol type refers to the communication protocol type enabling reliable transmission, under which the integrity of transmitted data can be guaranteed without handling the packet loss problem. The connectionless communication protocol type refers to a connectionless transport layer protocol type by which transaction-oriented simple unreliable data transfer can be provided.

Specifically, upon receiving the data download request for the target data, the terminal may query the fog node storing the target data from the content delivery network, and acquire the fog node information of the fog node storing the target data. In one embodiment, the content delivery network further includes a query server for storing fog node information of each fog node, and upon receiving the data download request, the terminal can query the fog node storing the target data from the query server, and acquire the fog node information of the fog node storing the target data. The query server refers to a server recording data downloaded by a fog node accessing the CDN. When the fog node downloads data from a preset cache server, the query server may record a data identifier of the data downloaded by the fog node, so that upon receiving the data download request for the target data, the terminal may query the fog node which has downloaded the target data from the query server based on the data identifier of the target data. The cache server refers to a server caching complete target data.

In one embodiment, the querying fog node information of at least one fog node corresponding to target data upon receiving a data download request for the target data includes the following steps: determine a fog node set corresponding to the target data according to the data identifier of the target data upon receiving the data download request for the target data, and acquire available resource information of each fog node in the fog node set; establish a penetration connection with each fog node in the fog node set; and determine a communication protocol type of each fog node in the fog node set according to the penetration connection.

Specifically, upon receiving the data download request for the target data, the terminal determines the data identifier of the target data, and query the fog node which has downloaded the target data from the query server based on the data identifier to obtain the fog node set. The query server may also store available resource information corresponding to each fog node, so that after the fog node set is obtained, the terminal may also obtain available resource information corresponding to each fog node in the fog node set.

Further, the terminal may initiate a penetration connection request to each fog node in the fog node set, so that the fog node returns a penetration request reply to the terminal based on the penetration connection request, thus, the terminal may establish a penetration connection with the fog node based on the penetration request reply, namely, establish a communication connection. During establishing of a penetration connection between the terminal and the fog node, the terminal may transmit a protocol detection request to the fog node based on the established penetration connection, and the communication protocol type used by the fog node is detected through the protocol detection request.

In one embodiment, the terminal may initiate a penetration connection request to the fog node based on a STUN (Session Traversal Utilities for NAT) protocol.

In one embodiment, the fog node may return a protocol detection request reply to the terminal based on the protocol detection request, and return the adopted communication protocol type through the protocol detection request reply. The communication protocol types returned by the fog node may include the bilateral reliable communication protocol type, the connectionless communication protocol type and the unknown protocol type. The bilateral reliable communication protocol specifically may be the Cable protocol, and the connectionless communication protocol specifically may be the UDP (User Datagram Protocol) protocol. The Cable protocol is a transmission protocol with reliable modules added on the basis of the UDP protocol. It is a reliable UDP protocol, and has the following features: 1. Cable and UDP protocol interfaces are identical, that is, the use methods are identical; 2. the cable protocol is a reliable protocol, and there is no need to actively handle packet loss; 3. the cable protocol is a bilateral reliable protocol, that is, both parties in communication need to use the Cable protocol to ensure reliable transmission; 4. the Cable protocol is compatible with the UDP protocol. The UDP protocol refers to a connectionless transport layer protocol in an OSI (Open System Interconnection) reference model, which can provide transaction-oriented simple and unreliable information transfer services.

In one embodiment, when the fog node specifies that it supports the UDP protocol, the protocol type of the UDP protocol may be transmitted to the terminal, for example, a fog node installed with a non-updated program in the CDN may transmit the protocol type of the UDP protocol to the terminal. When the fog node specifies that it supports the Cable protocol, the protocol type of the Cable protocol may be transmitted to the terminal, for example, a fog node installed with an updated program in the CDN may transmit the protocol type of the Cable protocol to the terminal. The unknown protocol type may be returned to the terminal when the fog node temporarily cannot specify its supported protocol. For different communication protocol types, the terminal may adopt different strategies for selecting the target fog node and slicing the data, to ensure compatibility and transmission quality.

In the above-mentioned embodiments, by performing detection of the communication protocol type after establishing a penetration connection with the fog node in the fog node set, it is not only possible to avoid adding a private protocol for performing detection of a protocol type in a STUN standard protocol thereby maintaining the purity of the protocol, but also possible to reduce the detection operations performed by the remaining layers in an OSI model by performing detection of the communication protocol type after establishing a penetration connection with the fog node in the fog node set since the detection of the communication protocol type belongs to the work of a transport layer.

S204: Determine a target fog node from at least one fog node based on fog node information.

Specifically, after the fog node information is obtained, the terminal may select the target fog node from the fog node set based on the fog node information. In one embodiment, the fog node information may include the communication protocol type and the available resource information, and the terminal may determine the target fog node from the at least one fog node based on the communication protocol type and the available resource information.

S206: Slice the target data to be downloaded according to the communication protocol type of the target fog node to obtain slice information of a data slice to be downloaded.

The data slice corresponds to part of the target data, and the slice information refers to information used for identifying the data part corresponding to the data slice in the target data. The slice information may specifically include a data identifier and a data range of the target data, such that the fog node may determine the data to be transmitted to the terminal based on the data identifier and the data range.

Specifically, compared with the fog node adopting the connectionless communication protocol or the unknown protocol, the fog node adopting the bilateral reliable communication protocol has better and more reliable performance. Therefore, in order to ensure the download speed and download reliability, the fog node adopting the bilateral reliable communication protocol can be fully used to download a larger data slice. For example, the terminal may download data slices with a slice size of 256K from the target fog node using the bilateral reliable communication protocol type and data slices with a slice size of 128K from the target fog node using the connectionless communication protocol type.

In one embodiment, the slicing the target data to be downloaded according to the communication protocol type of the target fog node to obtain slice information of a data slice to be downloaded includes the following steps: the terminal determines the slice size of the data slice to be downloaded according to the communication protocol type of the target fog node, thereby slicing the target data to be downloaded according to the determined slice size to obtain the slice information of the data slice to be downloaded.

Specifically, slice sizes corresponding to different communication protocol types may be set in advance. For example, the slice size corresponding to the target fog node using the bilateral reliable communication protocol is 256K, and the slice size corresponding to the target fog node using the connectionless communication protocol type is 128K. Thus, the terminal determines the slice size corresponding to the communication protocol type as the slice size of the data slice to be downloaded, and slices the target data to be downloaded based on the slice size to obtain the slice information of the data slice to be downloaded. For example, when the communication protocol type corresponding to the target node is the bilateral reliable communication protocol type, the slice size may be determined to be 256K, thus, the terminal determines 256K as the slice size of the data slice to be downloaded, and slices the target data based on the slice size to obtain the slice information of the data slice to be downloaded. Similarly, when the communication protocol type corresponding to the target node is the connectionless communication protocol type, the terminal determines 128K as the slice size of the data slice to be downloaded.

In the above-mentioned embodiments, the slice information may be determined by only determining the communication protocol type corresponding to the target fog node, and thus, the determination efficiency of the slice information is improved. S208: Transmit a slice download request to the target fog node corresponding to the data slice to be downloaded based on the slice information of the data slice to be downloaded.

Specifically, during determination of the slice information of the data slice, the terminal may transmit the slice information to the corresponding target fog node, so that the target fog node returns the data slice to the terminal according to the slice information, and thus, the download of the data slice is achieved. In one embodiment, the content delivery network includes a fog node and a cache server. Upon receiving a data download request for target data, the terminal may first pull the target data to be downloaded from the fog node; and when the target data downloaded from the fog node is incomplete, the remaining resources are downloaded from the cache server. The fog node and the cache server may be a same node in the CDN, and the fog node and the cache server may not be a same node in the CDN. The present embodiment is not limited thereto.

Steps S204 to S208 may be performed alternately or sequentially.

In one embodiment, when steps S204 to S208 are performed alternately, the fog node information further includes available resource information of the fog node and a single node download concurrency, and the determining a target fog node from the at least one fog node based on the fog node information includes the following steps: select a current target fog node from at least one fog node according to the communication protocol type, the available resource information and the single node download concurrency. The slicing the target data to be downloaded according to the communication protocol type of the target fog node to obtain slice information of a data slice to be downloaded includes the following steps: determine a target slice size for slicing according to the communication protocol type of the current target fog node; and slice the target data to be downloaded based on the target slice size to obtain the slice information of the current data slice to be downloaded. The transmitting a slice download request to the target fog node corresponding to the data slice to be downloaded based on the slice information of the data slice to be downloaded includes the following step: transmit a slice download request to the current target fog node based on the slice information of the current data slice to be downloaded to download the current data slice to be downloaded. The data download method further includes the following steps: update fog node information of the current target fog node, enter a process of downloading a data slice based on a next target fog node, and perform the operation of selecting a current target fog node from the at least one fog node according to the communication protocol type, the available resource information and the single node download concurrency until all the data slices to be downloaded corresponding to a target file are downloaded.

Specifically, the fog node information may include a communication protocol type of the fog node, available resource information and a single node download concurrency, and the terminal may select an optimal target fog node from the fog node set based on the communication protocol type, the available resource information and the single node download concurrency, and determine the current selected optimal target fog node as the current target fog node. The terminal may determine the communication protocol type of the current target fog node, and determine a target slice size for slicing according to the communication protocol type, to determine the slice information of the current data slice to be downloaded based on the determined target slice size and a range of data that has been sliced in the target data.

For example, when the communication protocol of the current target fog node is the bilateral reliable communication protocol type, the terminal may determine that the target slice size is 256K, and thus, when the target data has never been sliced, the terminal may set the data range in the slice information of the current data slice to be downloaded to 0K to 256K. It is to be understood that when the data range in the slice information of the current data slice to be downloaded is set to 0K to 256K, it can be considered that data in the range of 0K to 256K in the target data has been sliced, that is, the range of the data having been sliced in the target data can be updated to 0K to 256K, and thus, during determination of the slice information of the next data slice to be downloaded, the division may be performed with 256K as the starting point. When the communication protocol type of the current target fog node is the connectionless transfer type, the terminal may determine that the target slice size is 128K, and thus, when the target data has never been sliced, the terminal may set the data range in the slice information of the current data slice to be downloaded to 0K to 128K.

Further, upon receiving the slice information of the current data slice to be downloaded, the terminal may generate a slice download request according to the slice information of the current data slice to be downloaded, and transmit the slice download request to the current target fog node, so that the current target fog node returns the data slice to be downloaded to the terminal according to the received slice download request.

Since the current fog node needs to occupy a certain amount of available resources, for example, needs to occupy a certain available bandwidth, during transmission of the data slice based on the received slice information, the fog node information of the current target fog node needs to be updated. The terminal enters a process of determining a next target fog node and downloading a data slice based on the next target fog node, and performs the operation of selecting a current target fog node from the at least one fog node according to the communication protocol type, the available resource information and the single node download concurrency until all the data slices to be downloaded corresponding to a target file are downloaded.

In one embodiment, when steps S204 to S208 are performed sequentially, the determining a target fog node from at least one fog node based on the fog node information includes the following step: determine at least one target fog node from the fog nodes based on the fog node information. The slicing the target data to be downloaded according to the communication protocol type of the target fog node to obtain slice information of the data slice to be downloaded includes the following step: slice the target data to be downloaded according to the communication protocol type corresponding to each target fog node to obtain slice information of at least one data slice to be downloaded. The transmitting a slice download request to the target fog node corresponding to the data slice to be downloaded based on the slice information of the data slice to be downloaded includes the following step: transmit a slice download request to a target fog node corresponding to each of the data slices to be downloaded based on the slice information of each of the data slices to be downloaded.

Specifically, the terminal may determine the target node number of the target fog nodes that are to be selected based on the data size of the target data, select a target node number of fog nodes using the communication protocol type being the bilateral reliable communication protocol type and having available resources being greater than a preset resource threshold value from the fog node set, and determine the selected fog nodes as the target fog nodes. It is to be understood that when the number of fog nodes using the communication protocol type being the bilateral reliable communication protocol type, and having available resources greater than the preset resource threshold value in the fog node set is less than the number of target nodes, the terminal may also select the remaining number of fog nodes using the communication protocol type being the connectionless communication protocol type and having the available resources greater than the preset resource threshold value from the fog node set. For example, when the data size of the target data is 1024K, the slice size corresponding to the set bilateral reliable communication protocol is 256K, and the slice size corresponding to the connectionless communication protocol type is 128K, it may be determined that the target slice size for slicing can be 256K or 128K. In order to distribute slice information to each target fog node equally as much as possible to improve the download rate of the data slice, the computer device may divide 1024K by 128K to obtain eight target nodes, and thus, the terminal may select eight target fog nodes from the fog node set based on the communication protocol type and the available resource information. When the fog node set includes six fog nodes which adopt the bilateral reliable communication protocol type and have available resources greater than a preset resource threshold value, and five fog nodes which adopt the connectionless communication protocol type and have available resources greater than a preset resource threshold value, the terminal may take the six fog nodes which adopt the bilateral reliable communication protocol type and have the available resources greater than the preset resource threshold value as the target fog nodes, select two fog nodes from the five fog nodes which adopt the connectionless communication protocol type and have the available resources greater than the preset resource threshold value, and also determine the selected two fog nodes as the target fog nodes. Further, the terminal traverses each selected target fog node, determines the communication protocol type corresponding to each target fog node, determines a target slice size corresponding to each target fog node according to the communication protocol type corresponding to each target fog node, and slices the target data based on the target slice size corresponding to each target fog node to obtain slice information of at least one data slice to be downloaded. Slices to be downloaded after slicing can constitute complete target data. For example, when a currently traversed target fog node adopts the bilateral reliable communication protocol type, the terminal may determine that the target slice size for slicing is 256K, and thus, acquire the slice information corresponding to the currently traversed target fog node according to the range of data having been sliced in the target data. When the currently traversed target fog node adopts the connectionless communication protocol type, the terminal may determine that the target slice size for slicing is 128K, and thus, acquire the slice information corresponding to the currently traversed target fog node according to the range of data having been sliced in the target data. It is easy to be understood that after the slice information corresponding to the currently traversed target fog node is determined, the terminal may also update the range of the data having been sliced in the target data, and thus, determine slice information corresponding to a target fog node traversed next in sequence based on the updated the range of the data having been sliced in the target data. After the traversal is completed, slice information corresponding to each target fog node may be acquired, namely, the data slice to be downloaded corresponding to each target fog node is acquired.

Further, the terminal transmits each slice information to a corresponding target fog node to download data slice from the corresponding target fog node. It is to be understood that the number of selected target fog nodes may be greater than the number of slices to be downloaded, and at this time, the terminal may download data slices from some of the target fog nodes.

In one embodiment, the terminal selects a target node number of target fog nodes using the communication protocol type being the bilateral reliable communication protocol type and having the available resources being greater than the preset resource threshold value from the fog node set. The target slice size for slicing is determined according to the type of the bilateral reliable communication protocol type, and the target data is sliced based on the target slice size to obtain the slice information of at least one data slice to be downloaded. For example, when the target slice size is 256K and the data size of the target data is 1024K, the terminal may divide the target data into 4 data slices and generate the slice information corresponding to each data slice. Further, the terminal evenly distributes the generated slice information to the target fog nodes to download corresponding data slices from the target fog nodes to obtain target data.

S210: Acquire the target data by combining the data slice returned by each target fog node in response to a corresponding slice download request.

Specifically, the terminal receives the data slice returned by each target fog node in response to the download request, and combines the received data slice to obtain the target data. For example, when the target data is a target video, the terminal may combine each slice video to acquire the target video, and play the target video through a multimedia playing application.

Figure 3:
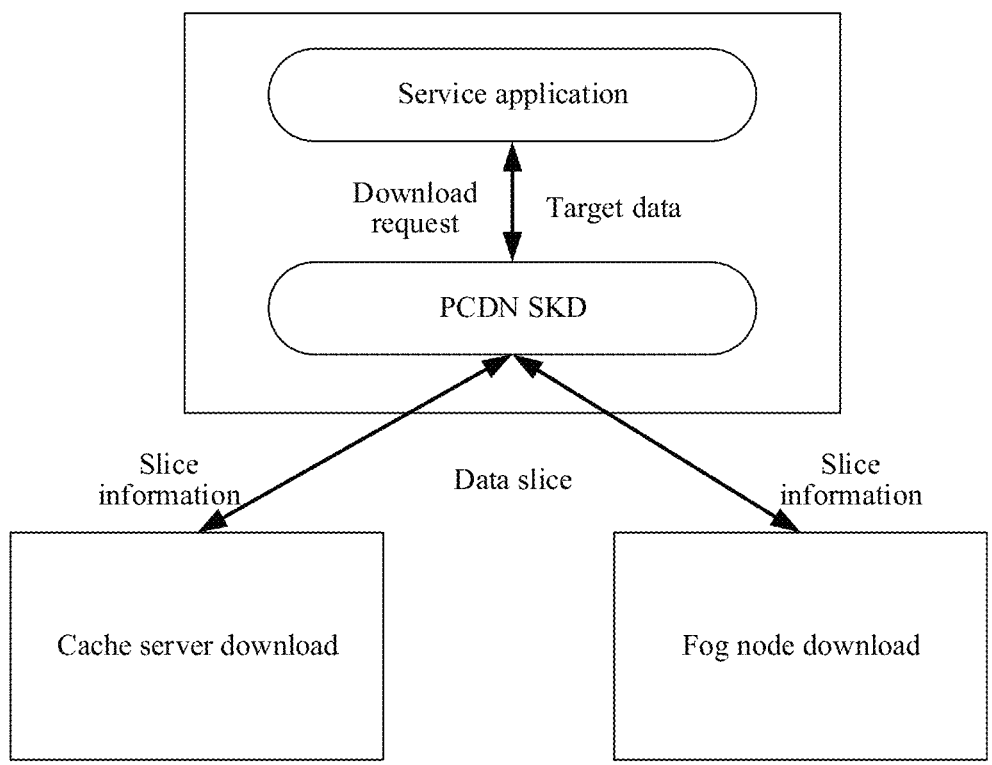
FIG. 3 is a schematic diagram of downloading target data based on a PCDN SDK in one embodiment.

In one embodiment, referring to FIG. 3, a service application and a peer content delivery network software development kit (PCDN SDK) may be installed in THE terminal. The terminal may acquire the target data from the content delivery network based on the PCDN SDK, so that the service application can acquire the target data returned by the PCDN SDK only by initiating a data download request to the PCDN SDK without the need for the service application itself to download data. The PCDN SDK may adopt the above-mentioned data download method to download the target data, and the PCDN SDK may first download the data from the fog nodes, and then download the remaining data from the cache server. FIG. 3 is a schematic diagram of downloading target data based on the PCDN SDK in one embodiment.

Figure 4:
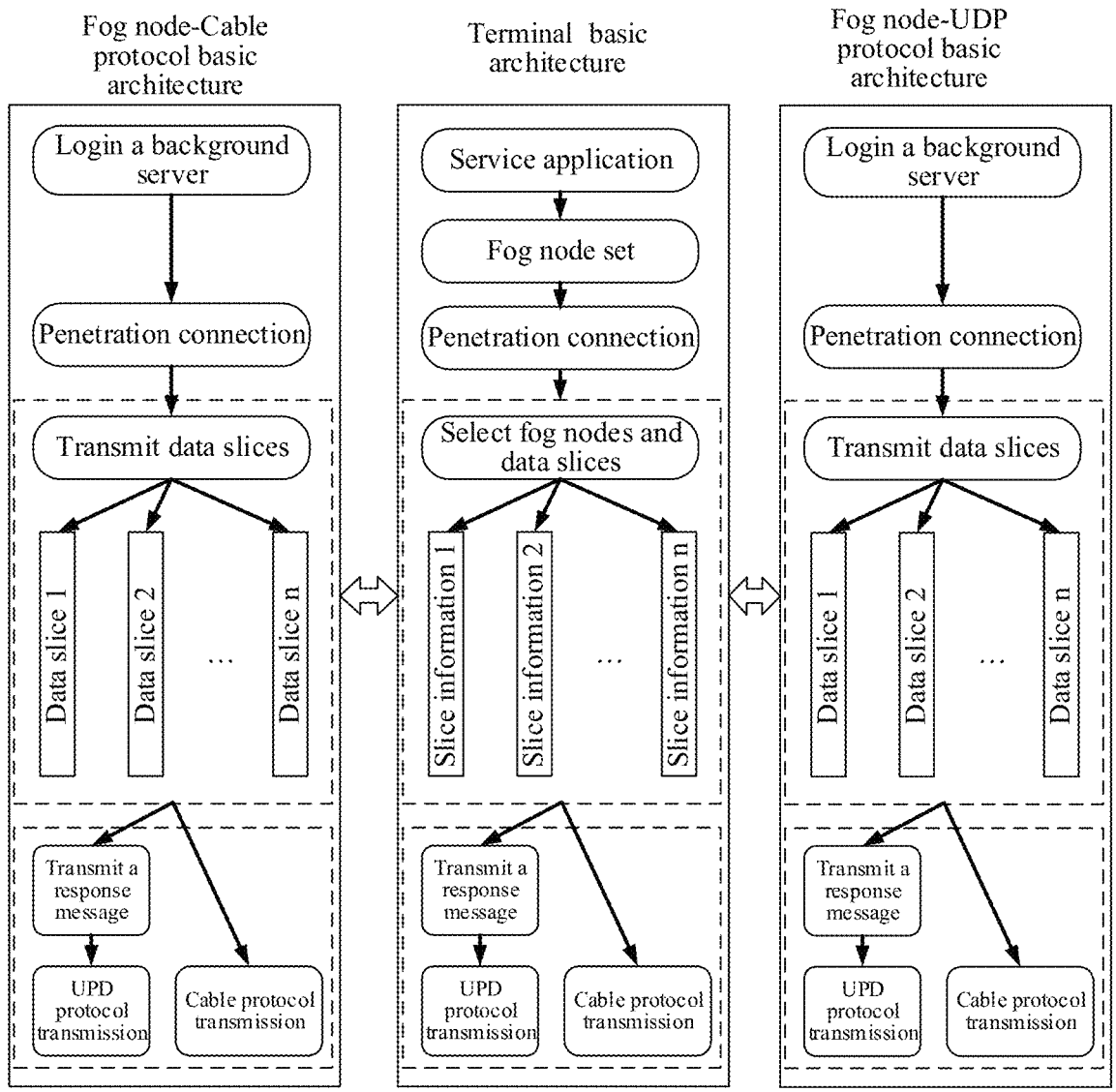
FIG. 4 is a schematic diagram of a data download architecture in one embodiment.

In one embodiment, the bilateral reliable communication protocol specifically may be the Cable protocol, and the connectionless communication protocol specifically may be the UDP protocol. Referring to FIG. 4, FIG. 4 is an architecture schematic diagram of data download in one embodiment. The fog node may adopt the connectionless communication protocol or the bilateral reliable communication protocol, and the PCDN SDK may adopt the Cable communication protocol. The Cable protocol is compatible with the UDP communication protocol. Compatibility with the UDP protocol means that a device employing the Cable protocol may use both the UDP protocol and the Cable protocol to transmit data. During receiving a data download request transmitted by the service application, the PCDN SDK may query the fog node set containing the target data, establish a penetration connection with fog nodes in the fog node set, and acquire the communication protocol type through the penetration connection. The PCDN SDK selects the target fog node according to the communication protocol type, and slices the target data to be downloaded to acquire the slice information of the data slice to be downloaded. The PCDN SDK transmits the slice download request carrying the slice information to the target fog node via the communication protocol type of the target fog node to download the data slice from the target fog node.

Often, the terminal communicates with the fog node via the connectionless communication protocol, but a transmission scheme based on the connectionless communication protocol has the disadvantages of a low data download speed and a high retransmission bandwidth. However, in this application, by introducing the bilateral reliable communication protocol in a data slice download scenario of the fog node, the download speed can be increased and repeated retransmission of data can be reduced based on the bilateral reliable communication protocol, thereby ensuring a low-cost and high-quality content delivery network service.

In the above-mentioned data download method, by acquiring the data download request for the target data, the fog node information of at least one fog node corresponding to the target data may be queried based on the data download request, so that the target fog node with better equipment performances can be selected from the at least one fog node based on the fog node information, and then the download rate of the target data can be improved based on the target fog node with better equipment performances. By determining the target fog node, the target data may be sliced based on the communication protocol type of the target fog node to acquire the slice information which is more in line with the characteristics of the target fog node. Accordingly, the slice download request may be transmitted to a corresponding target fog node based on the slice information which is more in line with the characteristics of the target fog node, to quickly download the data slice from the target fog node. By downloading the data slice from the target fog nodes, the data slice returned by each target fog node can be combined to acquire the target data. In this application, as the communication protocol type adopted by the fog node can be detected to select an appropriate target fog node to download a corresponding data slice according to the detected communication protocol type, it is compatible with different communication protocol types and download data slices from the target fog nodes adopting different communication protocol types.

In one embodiment, the selecting a current target fog node from at least one fog node according to the communication protocol type, the available resource information and the single node download concurrency includes the following step: select a fog node using the communication protocol type being the bilateral reliable communication protocol type, and having the available resources satisfying a preset idle condition and a single node download concurrency being less than a number threshold value from the at least one fog node, and determining the selected fog node as the current target fog node.

Specifically, in determination of the current target fog node needs from the at least one fog node, the terminal may traverse at least one fog node, and select the fog node using the communication protocol type being the bilateral reliable communication protocol type, and having the available resources satisfying a preset idle condition, and a single node download concurrency being less than the number threshold value from the at least one fog node, and determine the selected fog node as the current target fog node. For example, one fog node using the communication protocol type being the bilateral reliable communication protocol type, and having maximum available resources, and a single node download concurrency being less than the number threshold value may be selected from at least one fog node. The single node download concurrency refers to the number of slice download requests processed in parallel by a single fog node. In order to avoid all slice download requests rushing to one fog node at the same time, it is necessary to control the number of requests for a single fog node to process slice download requests in parallel. The single node download concurrency can be freely set according to requirements, for example, the single node download concurrency may be set to 2, so that when the number of slice download requests processed in parallel by the fog node reaches 2, the operation of allocating a new slice download request to the fog node is suspended until the number of slice download requests processed in parallel by the fog node is less than 2.

In one embodiment, since the performance of a fog node adopting the bilateral reliable communication protocol is stronger than that of a fog node using the connectionless communication protocol, and since the greater the available resources, the faster the data slice download rate, the terminal may be based on the following principles: 1. selecting a fog node which supports the bilateral reliable communication protocol; 2. selecting a fog node having large available resources; 3. selecting the most excellent fog node from at least one fog node as the current target fog node when the single node download concurrency is less than the number threshold value.

In the above-mentioned embodiments, the download rate of the data slice can be improved based on the selected fog node by selecting a fog node using the communication protocol type being the bilateral reliable communication protocol type, and having the available resources satisfying a preset idle condition and a single node download concurrency being less than a number threshold value from the at least one fog node.

In one embodiment, the determining the target slice size for slicing according to the communication protocol type of the current target fog node includes: determine the target slice size for slicing based on a first target value when the communication protocol of the current target fog node is the bilateral reliable communication protocol type; and determine the target slice size for slicing based on a second target value when the communication protocol of the current target fog node is the connectionless communication protocol type, the second target value being different from the first target value.

Specifically, for each of the plurality of target fog nodes, the terminal determines the target slice size for slicing according to the communication protocol type of the current target fog node. When the communication protocol type of the current target fog node is the bilateral reliable communication protocol type, the terminal determines the target slice size for slicing based on the first target value. For example, the terminal may determine that the target slice size is 256K, and thus, the terminal may download data slice with a data size of 256K from the current target fog node. When the communication protocol type of the current target fog node is the connectionless communication protocol type, the terminal determines the target slice size for slicing based on the second target value. For example, the terminal may determine that the target slice size is 128K, and thus, the terminal may download a data slice with a data size of 128K from the current target fog node.

For example, when the communication protocol type of the current target fog node is the bilateral reliable communication protocol type, the terminal may determine that the target slice size is 256K, thus, the terminal may slice the target data to be downloaded based on the determined target slice size to determine that the data range in the slice information corresponding to the current target fog node is 0K to 256K, and then the current target fog node may transmit the data of 0K to 256K to the terminal according to the slice information. When the communication protocol type of the next target fog node is the connectionless communication protocol type, the terminal may determine that the target slice size is 128K, the data range in the slice information corresponding to the next target fog node is 256K to 384K, and thus, the next target fog node may transmit data of 256K to 384K to the terminal based on the slice information. It is to be understood that the slice size of the non-downloaded data slice may be less than the first target value or the second target value, and then, the terminal may determine that the target slice size is the size of the remaining non-downloaded data.

In the above-mentioned embodiments, since different fog nodes have different performances, if a complete target data is completely delivered to a fog node for downloading, the probability of data download failure will be greatly increased, therefore, it is necessary to slice the target data and download different data slices from different fog nodes. Thus, not only the available resources of the fog node can be fully used to ensure the downloading rate, but also the downloading success rate of the overall data can be improved. In addition, downloading a larger data slice from the target fog node adopting the bilateral reliable communication protocol type can make full use of the performance of the target fog node adopting the bilateral reliable communication protocol type, and thus, the download rate is further improved.

In one embodiment, the transmitting a slice download request to a target fog node corresponding to each of the data slices to be downloaded based on the slice information of each of the data slices to be downloaded includes the following steps: generate a slice download request corresponding to each of the data slices to be downloaded based on the slice information corresponding to each of the data slices to be downloaded; and transmit the slice download request to a target fog node corresponding to each of the data slices to be downloaded in a parallel, the number of the data slices downloaded simultaneously being less than or equal to a preset overall maximum concurrency.

Specifically, upon receiving slice information of a plurality of data slices to be downloaded, the terminal may generate a slice download request corresponding to each of the data slices to be downloaded according to the slice information. Since the corresponding relationship between the data slices to be downloaded and the target fog node is stored in the terminal, the terminal may transmit the generated slice download requests to the corresponding target fog node in parallel according to the corresponding relationship between the data slices to be downloaded and the target fog node, to achieve the purpose of processing the slice download requests in parallel.

Since the fog node is often a user terminal in the CDN, and the download bandwidth of the user terminal is limited, in order to ensure the download rate of each data slice without affecting the user experience, it is necessary to limit the overall maximum concurrency of data slices download. The overall maximum concurrency refers to the number of slice requests simultaneously processed in parallel in the CDN for the current target data, and the overall maximum concurrency can be freely set according to requirements. For example, when the overall maximum concurrency is 8, the number of slice requests simultaneously processed in the CDN is at most 8 for the current target data.

In one embodiment, when steps S204 to S206 are performed successively, the terminal may generate slice download requests corresponding to each slice information, and divide the generated slice download requests according to the overall maximum concurrency to obtain multiple group of download requests. For example, when the overall maximum concurrency is 8, every eight slice download requests may be used as a group of download requests. Further, the terminal may process each group of download requests in the multiple groups of download requests successively, and upon receiving a corresponding data slice based on a current group of download requests, the terminal transmits a next group of download requests to a corresponding target fog node, to achieve that the number of data slices downloaded simultaneously is less than or equal to the overall maximum concurrency.

Figure 5:
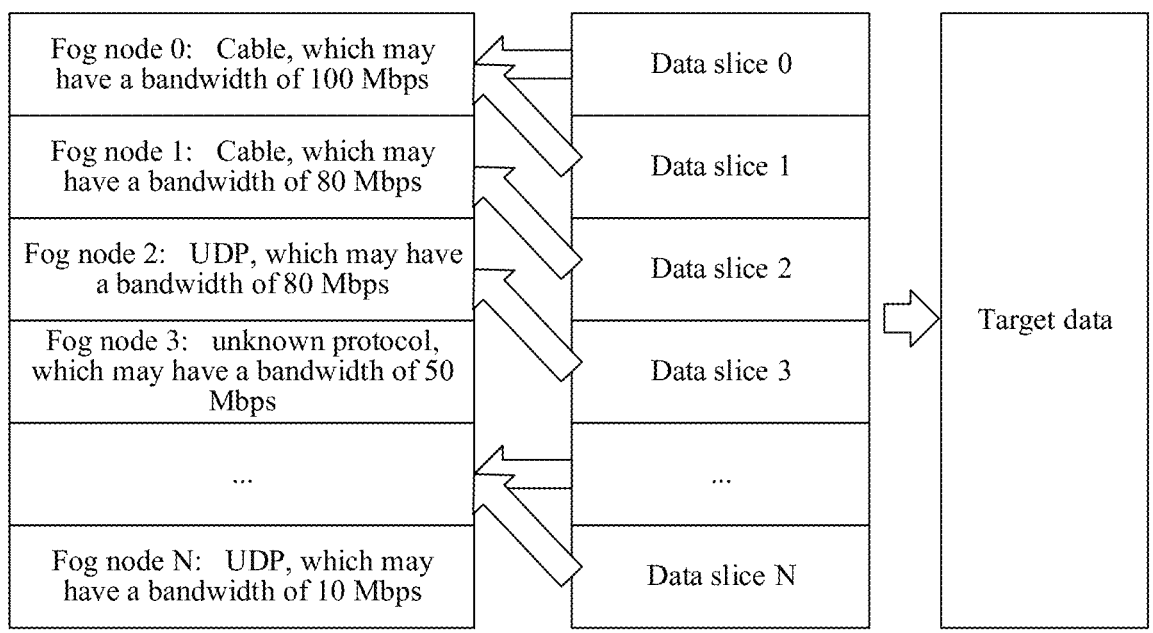
FIG. 5 is a schematic diagram of data slice download in one embodiment.

In one embodiment, when steps S204 to S206 are alternately performed, refer to FIG. 5 The target download data is shown on the right side of FIG. 5, and the fog node information of the fog node is shown on the left side, for example, the fog node 0 supports the Cable protocol and has an available bandwidth of 100 Mbps, and the fog node 2 supports the UDP protocol and has an available bandwidth of 80 Mbps.

Assuming that the data size of the target data to be downloaded is 1150K, the target slice size may be 256K or 128K. When the single node concurrency is 2 and the overall maximum concurrency is 8, the terminal may select the fog node using the communication protocol type being the bilateral reliable communication protocol type, and having the maximum available resource, and a single node download concurrency being less than 2 from at least one fog node according to the current target fog node selection strategy as the current target fog node, that is to say, the terminal determines the fog node 0 as the current target fog node. Since there is currently no data slice to be download, i.e. the overall maximum concurrency is 0 and less than 8, the terminal downloads a data slice 1 with a data size of 256K from the fog node 0. At this time, the overall concurrency is updated from 0 to 1, which is less than the overall maximum concurrency. Similarly, the fog node 0 is still the most excellent fog node in the at least one fog node, therefore the terminal may also download the data slice 1 from the fog node 0, at this time, the number of slice download requests processed in parallel by the fog node 0 is 2, reaching the single node download concurrency, and thus, the terminal suspends the allocation of slice requests to the fog node 0.

The terminal selects the fog node using the communication protocol type being the bilateral reliable communication protocol type, and having available resources satisfying a preset idle condition, and a single node download concurrency being less than a number threshold value from at least one fog node again as the current target fog node, that is to say, the terminal uses the fog node 1 as the current target fog node, and downloads a data slice 2 from the fog node 1. The operations are iterated until the overall maximum concurrency reaches 8, then transmission of slice download requests to the CDN is suspended. It is to be understood that, when the data slice download is completed and the overall maximum concurrency in the CDN becomes less than 8, the terminal continues to transmit a new slice download request to the CDN. FIG. 5 is a schematic diagram of data slice download in one embodiment.

In the above-mentioned embodiments, the download rate of data slices can be greatly improved by processing the slice download requests in parallel. By setting the overall maximum concurrency, the download rate of each data slice can be further improved without affecting the user experience.

In one embodiment, the data download method is performed by a terminal, the communication protocol types include the bilateral reliable communication protocol type and the connectionless communication protocol type, and the transmitting a slice download request to the target fog node corresponding to the data slice to be downloaded based on the slice information of the data slice to be downloaded includes: transmit, by the terminal, the slice download request to the target fog node corresponding to the data slice to be downloaded via the bilateral reliable communication protocol or the connectionless communication protocol when the terminal supports the bilateral reliable communication protocol type; and transmit, by the terminal, the slice download request to the target fog node corresponding to the data slice to be downloaded via the connectionless communication protocol when the terminal only supports the connectionless communication protocol type.

The bilateral reliable communication protocol is compatible with the connectionless communication protocol, and compatibility with the connectionless communication protocol means that a device adopting the bilateral reliable communication protocol may adopt both the connectionless communication protocol and the bilateral reliable communication protocol to transmit data, The premise of using the bilateral reliable communication protocol to transmit data is that the opposite end also supports the bilateral reliable communication protocol.

Specifically, since the bilateral reliable communication protocol is compatible with the connectionless communication protocol, when the terminal supports the bilateral reliable communication protocol, the terminal may transmit the slice download request to the target fog node via the bilateral reliable communication protocol, and may also transmit the slice download request to the target fog node via the connectionless communication protocol. For example, when the target fog node adopts the connectionless communication protocol, the terminal may transmit the slice download request to the target fog node via the connectionless communication protocol, and receive the data slice returned by the target fog node via the connectionless communication protocol. When the target fog node adopts the bilateral reliable communication protocol, the terminal may transmit the slice download request to the target fog node via the bilateral reliable communication protocol, and receive the data slice returned by the target fog node via the bilateral reliable communication protocol.

When the terminal only supports the connectionless communication protocol type, the terminal may transmit the slice download request to the target fog node corresponding to the data slice to be downloaded only via the connectionless communication protocol, and receive the data slice returned by the target fog node via the connectionless communication protocol.

In one embodiment, the terminal may transmit the slice download request to the target fog node through the PCDN SDK. Since different services have strict requirements on the installation package size of the PCDN SDK, including the bilateral reliable communication protocol will make the installation package of the PCDN SDK larger, so it is necessary to confirm whether to access the bilateral reliable communication protocol according to specific service requirements. Meanwhile, as a third-party transmission protocol, the bilateral reliable communication protocol has unknown risks. Therefore, in order to ensure the service quality and stability, the PCDN SDK shall have the ability to open and close the bilateral reliable communication protocol. When the PCDN SDK enables the bilateral reliable communication protocol, the PCDN SDK may transmit the slice download request to the target fog node via the bilateral reliable communication protocol. When the PCDN SDK disables the bilateral reliable communication protocol, the PCDN SDK may transmit the slice download request to the target fog node only via the connectionless communication protocol.

In the above-mentioned embodiments, since the bilateral communication protocol is compatible with the connectionless communication protocol, the terminal may be compatible with edge devices adopting different communication protocol types, and thus, the compatibility of the terminal is greatly improved.

In one embodiment, the data slice includes at least one resource data packet, and the above-mentioned data download method further includes the following steps: determine a resource data packet downloaded from the current target fog node when the communication protocol type of the current target fog node is the target protocol type with regard to each target fog node in a plurality of target fog nodes; and generate a corresponding response message according to the resource data packet, and transmit the response message to the current target fog node, the response message being used for instructing the current target fog node to retransmit the resource data packet not received by the terminal based on the resource data packet already received by the terminal.

Specifically, with regard to each target fog node in a plurality of target fog nodes, upon receiving the slice download request, the current target fog node may determine data slice to be transmitted to the terminal based on slice information in the slice download request, divide the data slice into at least one resource data packet, and return the resource data packet to the terminal. For example, when the data size of the data slice to be transmitted to the terminal is 32K, the current target fog node may divide the data slice into 32 resource data packets, with the size of each resource data packet is being 1K, and thus, the current target fog node may transmit 32 resource data packets of 1K to the terminal.

Further, the terminal determines the communication protocol type adopted by the current target fog node, and determines the resource data packet which has been downloaded from the current target fog node at present when the current target fog node adopts the target protocol type. For example, when the current target fog node adopts the connectionless communication protocol type, the downloaded resource data packet is determined. The terminal generates corresponding response information according to the resource data packets which have been downloaded from the current target fog node at present, and returns the response information to the current target fog node, so that the current target fog node determines a resource data packet which has not been successfully transmitted according to the response information, and retransmits the resource data packet which has not been successfully transmitted to the terminal. For example, in the above-mentioned embodiment, when it is determined that the current target fog node transmits 32 resource data packets of 1K to the terminal, but 30 resource data packets have been received, it can be determined that 2 resource data packets are currently lost, so that the terminal transmits a response message to the target fog node.

In one embodiment, the target protocol type may be the connectionless transmission protocol type. When the current target fog node adopts the connectionless transmission protocol to transmit the resource data packets to the terminal, since the connectionless transmission protocol is the unreliable transmission protocol, it can be considered that packet loss will occur. Therefore, the terminal regularly transmits the response message to the current target fog node, so that the current target fog node retransmits the resource data packet unsuccessfully transmitted according to the application message. When the current target fog node adopts the bilateral reliable communication protocol type, that is, the terminal adopts the bilateral reliable communication protocol to transmit the slice download request to the terminal, and the current target fog node adopts the bilateral reliable communication protocol to return the resource data packet to the terminal, since the bilateral reliable communication protocol is the reliable transmission communication protocol, it can be considered that packet loss will not occur, and therefore the terminal stops generating a response message.

In one embodiment, after the current target fog node transmits the last resource data packet, it can be considered that the current target fog node has completed transmission of the data slice, and after the terminal has received all the data slices corresponding to the target data within a predetermined time, it can be considered that the target data has been downloaded. In addition, when a timeout period has elapsed, and part of the data slice is downloaded, that is, when the terminal does not receive all the data slices within a predetermined time, the terminal still determines that the target data download is completed, and at this time, the terminal releases all the occupied resources and notifies the target fog node to leave. In the above-mentioned embodiment, by generating the response message, the target fog node may retransmit the resource data packet based on the received response message, and thus, the transmission success rate of the resource data packet is improved.

In one embodiment, the target protocol type includes the unknown protocol type, and the above-mentioned data download method further includes the following steps: suspend transmission of the response message to the current target fog node when the communication protocol type of the current target fog node is updated from the unknown protocol type to the bilateral reliable communication protocol type based on the resource data packet received by the terminal; and continue transmission of the response message to the current target fog node when the communication protocol type of the current target fog node is updated from the unknown protocol type to the connectionless communication protocol type based on the resource data packet received by the terminal.

Specifically, for each of the plurality of target fog nodes, the terminal may periodically transmit a response message to the current target fog node when the current target fog node adopts the unknown protocol type. When the protocol type supported by the target fog node cannot be determined temporarily, it can be considered that the target fog node adopts the unknown protocol type for communication. Upon receiving the resource data packet transmitted by the current target fog node, the terminal may determine whether the current target fog node supports the bilateral reliable communication protocol type based on the received resource data packet. When it is determined based on the received resource data packet that the current target fog node supports the bilateral reliable communication protocol type, the terminal suspends transmission of a response message to the current target fog node, and when it is determined based on the received resource data packet that the current target fog node does not support the bilateral reliable communication protocol type, that is to say, it is determined that the current target fog node supports the connectionless communication protocol type or still the unknown protocol type, the terminal continues transmission of the response message to the current target fog node.

In the above-mentioned embodiment, computer resources consumed in transmitting the response message may be reduced by suspending transmission of the response message to the current target fog node when the communication protocol type of the current target fog node is updated from the unknown protocol type to the bilateral reliable communication protocol type.

In one embodiment, the target data is a target video, the data download request is a video download request for the target video initiated by the multimedia playing application, and the above-mentioned data download method further includes the following steps: transmit the target video to the multimedia playing application after the target video is downloaded; and play the target video through the multimedia playing application.

Specifically, the terminal may run the multimedia playing application, and when the multimedia playing application needs to play the target video, the multimedia playing application may generate a video download request based on a video identifier of the target video, and transmit the video download request to the PCDN SDK. The PCDN SDK determines fog nodes caching the target videos based on the video identifiers in the video download requests, selects the target fog node from the determined fog nodes, and downloads a corresponding data slice from the target fog node. The PCDN SDK then synthesizes the downloaded data slices to obtain the target video, and transmits the target video to the multimedia playing application. The multimedia playing application can then play the target video. The target video includes but is not limited to video-on-demand and live video.

In the above-mentioned embodiments, by downloading the target video, the multimedia playing application can correspondingly play the downloaded target video, and thus, the user experience is improved.

This application also provides an application scenario, which is applied to the above-mentioned data download method. Specifically, the application of the data download method in the application scenario is as follows.

Figure 6:
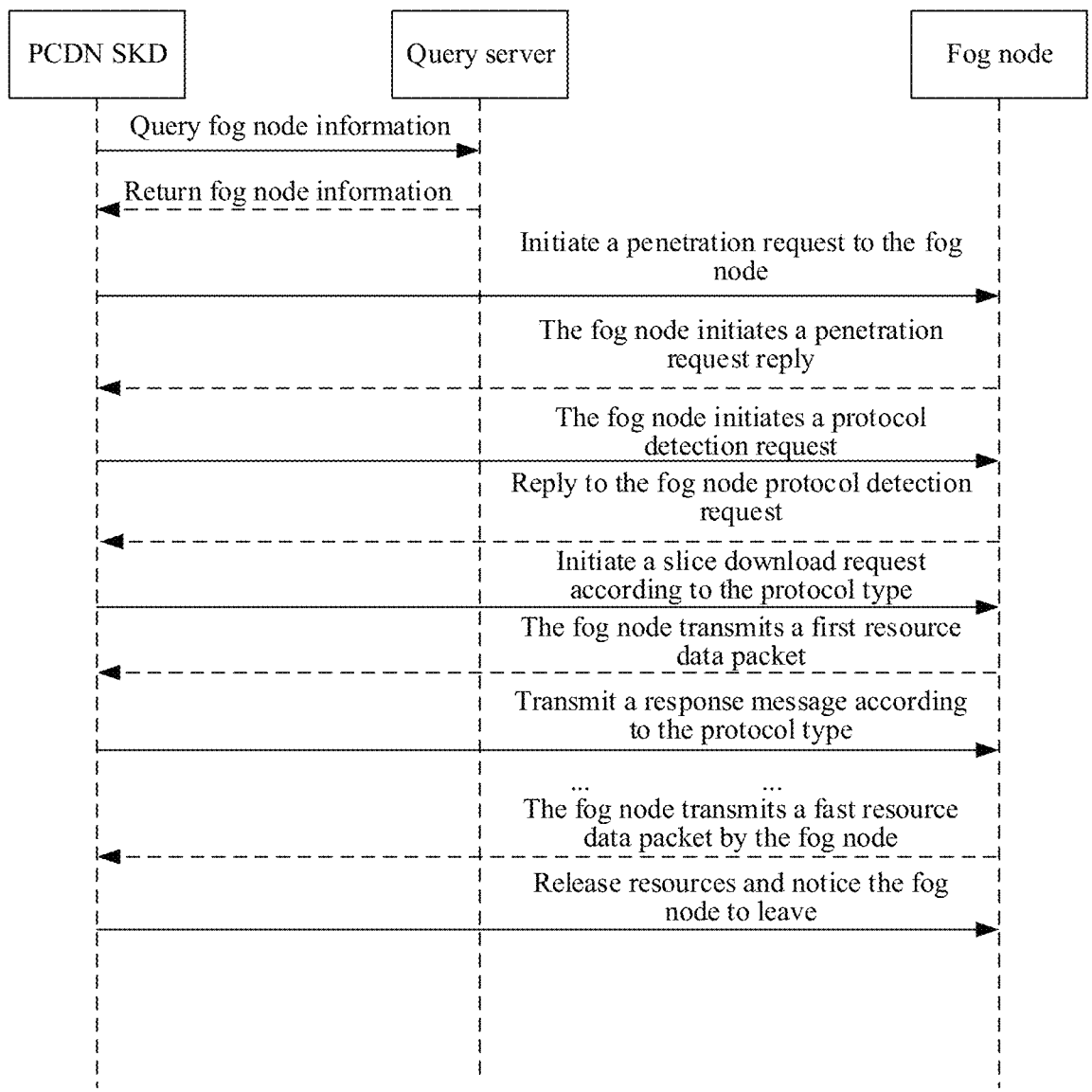
FIG. 6 is an interaction schematic diagram of data download in one embodiment.

Referring to FIG. 6, when a target game application needs to play the transition animation of the target game, the target game application may transmit a data download request for the transition animation to the PCDN SDK, so that the PCDN SDK queries a query server for the fog node set caching the transition animation and available resource information of the fog nodes in the fog node set based on the data download request. The PCDN SDK initiates a penetration request to a fog node in the fog node set, establishes a penetration connection with the fog node via the penetration request, and initiates a protocol detection request to the fog node via the penetration connection to detect the communication protocol type adopted by the fog node. The PCDN SDK selects the target fog node from the fog node set by integrating the communication protocol type and the available resource information, and slices the target data according to the communication protocol type of the target fog node to obtain a slice download request. The PCDN SDK transmits a slice download request to a corresponding target fog node, so that the target fog node returns a resource data packet to the terminal according to slice information in the slice download request. The terminal transmits a response message to the target fog node based on the received resource data packet, releases the occupied resources after all the resource data packets have been received, and notifies the target fog node to leave, that is, disconnects a penetration connection with the target fog node. The terminal synthesizes all the received resource data packets to obtain the transition animation, and returns the transition animation to the target game application, so that the target game application can correspondingly play the transition animation. FIG. 6 is an interaction schematic diagram of data slice download in one embodiment.

This application further provides an application scenario, and the application scenario applies the above-mentioned data download method. Specifically, the application of the data download method in the application scenario is as follows.

When a user needs to watch a live video, the user may open the live application, so that the live application may transmit a data download request to the PCDN SDK, the PCDN SDK pulls the live data from the fog node, and returns the pulled live data to the live application, and thus, the live application may correspondingly play the live video according to the received live data.

Figure 7:
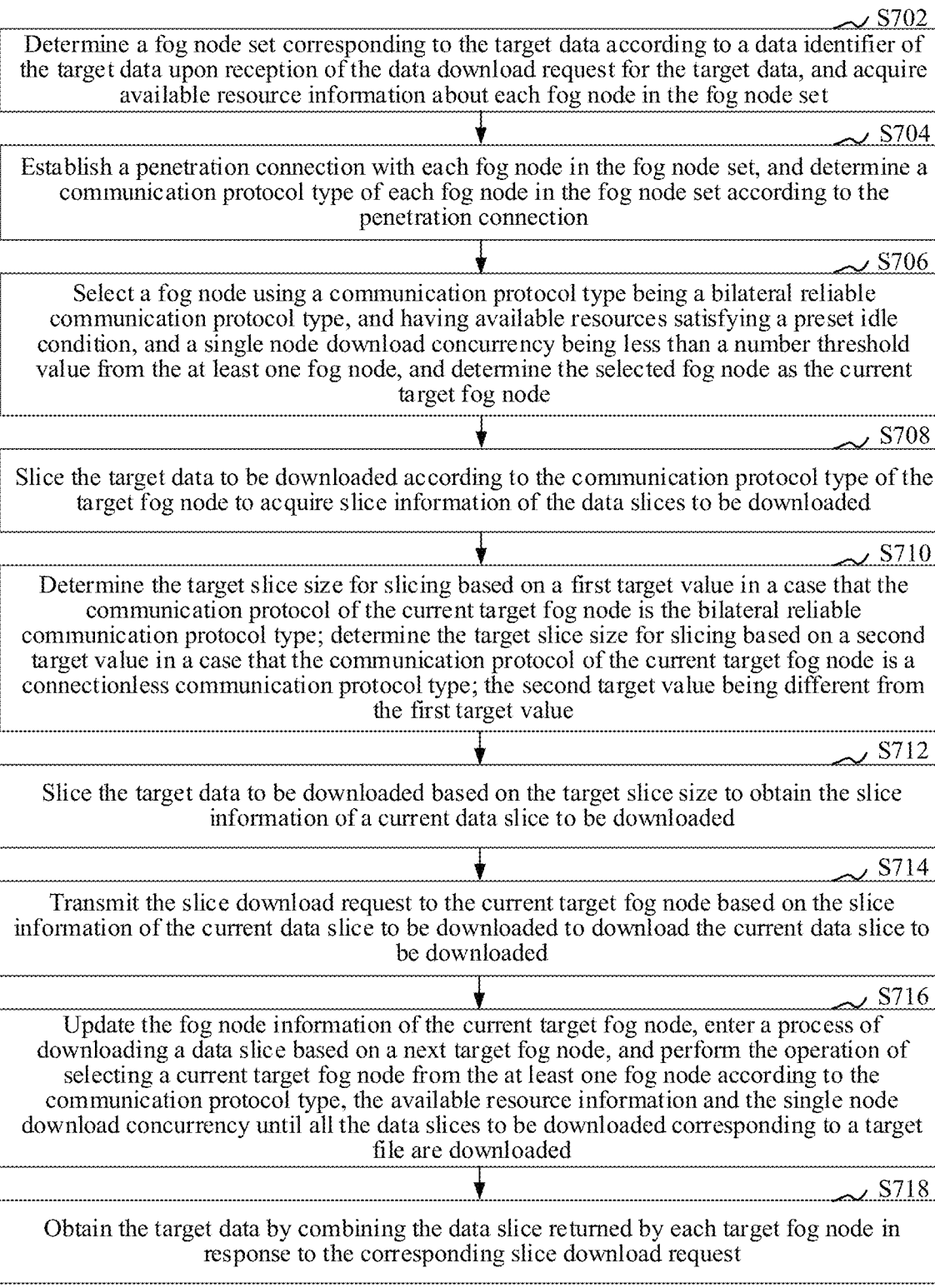
FIG. 7 is a flowchart of data download in one specific embodiment.

In one embodiment, as shown in FIG. 7, the data download method provided by this application includes the following steps.

S702: Determine a fog node set corresponding to the target data according to the data identifier of the target data upon receiving the data download request for the target data, and acquire available resource information of each fog node in the fog node set.

S704: Establish a penetration connection with each fog node in the fog node set; and determine a communication protocol type of each fog node in the fog node set according to the penetration connection.

S706: Select a fog node. using the communication protocol type being the bilateral reliable communication protocol type, and having the available resources satisfying a preset idle condition and a single node download concurrency being less than a number threshold value from the at least one fog node as the current target fog node.

S708: Slice the target data to be downloaded according to the communication protocol type of the target fog node to obtain slice information of the data slice to be downloaded.

S710: Determine the target slice size for slicing based on a first target value when the communication protocol of the current target fog node is the bilateral reliable communication protocol type; and determine the target slice size for slicing based on a second target value when the communication protocol of the current target fog node is the connectionless communication protocol type, the second target value being different from the first target value.

S712: Slice the target data to be downloaded based on the target slice size to obtain the slice information of the current data slice to be downloaded.

S714: Transmit a slice download request to the current target fog node based on the slice information of the current data slice to be downloaded to download the current data slice to be downloaded.

S716: Update fog node information of the current target fog node, enter a process of downloading a data slice based on a next target fog node, and perform the operation of selecting a current target fog node from the at least one fog node according to the communication protocol type, the available resource information and the single node download concurrency until all the data slices to be downloaded corresponding to a target file are downloaded.

S718: Acquire the target data by combining the data slice returned by each target fog node respectively in response to a corresponding slice download request.

In the above-mentioned data download method, by acquiring the data download request for the target data, the fog node information of at least one fog node corresponding to the target data may be queried based on the data download request, the target fog node with better equipment performances can be selected from the at least one fog node based on the fog node information. The download rate of the target data can be improved based on the target fog node with better equipment performances. By determining the target fog node, the target data may be sliced based on the communication protocol type of the target fog node to acquire the slice information which is more in line with the characteristics of the target fog node. Accordingly, the slice download request may be transmitted to a corresponding target fog node based on the slice information which is more in line with the characteristics of the target fog node, to quickly download the data slice from the target fog node. By downloading the data slice from the target fog nodes, the data slice returned by each target fog node can be combined to acquire the target data. In this application, as the communication protocol type adopted by the fog node can be detected to select an appropriate target fog node to download a corresponding data slice according to the detected communication protocol type, the data download is compatible with different communication protocol types and download data slices from the target fog nodes adopting different communication protocol types.

Figure 8:
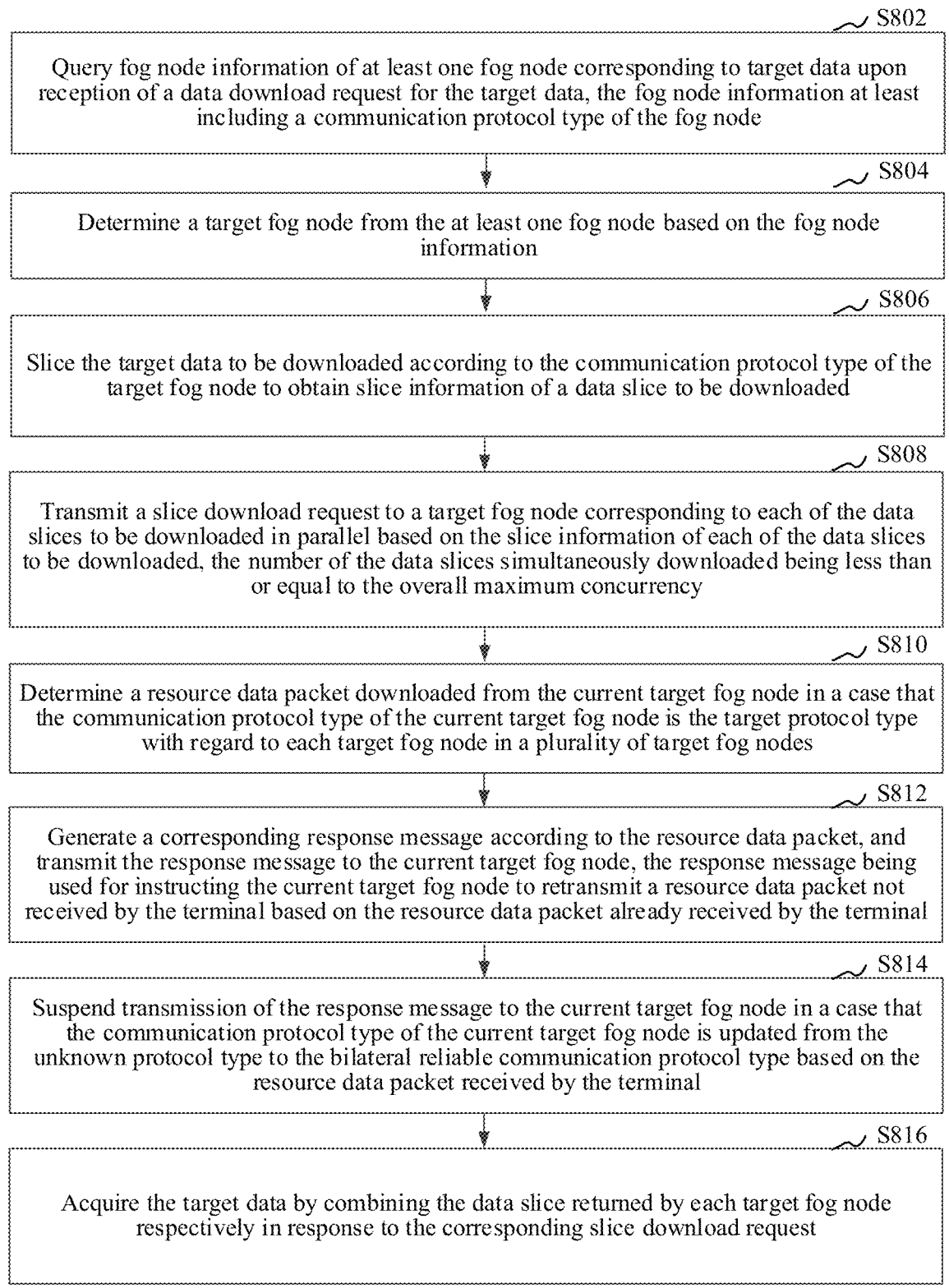
FIG. 8 is a flowchart of data download in one specific embodiment.

In one embodiment, as shown in FIG. 8, the data download method provided by this application includes the following steps.

S802: Query fog node information of at least one fog node corresponding to target data upon receiving a data download request for the target data, the fog node information at least including a communication protocol type of the fog node.

S804: Determine a target fog node from at least one fog node based on the fog node information.

S806: Slice the target data to be downloaded according to the communication protocol type of the target fog node to obtain slice information of the data slice to be downloaded.

S808: Transmit a slice download request to a target fog node corresponding to each of the data slices to be downloaded in parallel based on the slice information of each of the data slices to be downloaded, the number of the data slices downloaded simultaneously being less than or equal to an overall maximum concurrency.

S810: Determine a resource data packet downloaded from the current target fog node when the communication protocol type of the current target fog node is the target protocol type with regard to each target fog node in a plurality of target fog nodes.

S812: Generate a corresponding response message according to the resource data packet, and transmitting the response message to the current target fog node, the response message being used for instructing the current target fog node to retransmit the resource data packet not received by the terminal based on the resource data packet already received by the terminal.

S814: Suspend transmission of the response message to the current target fog node when the communication protocol type of the current target fog node is updated from the unknown protocol type to the bilateral reliable communication protocol type based on the resource data packet received by the terminal.

S816: Acquire the target data by combining the data slice returned by each target fog node respectively in response to a corresponding slice download request.

It should be understood that although the steps in the flowcharts of FIG. 2, FIG. 7, and FIG. 8 are sequentially displayed in accordance with instructions of arrows, these steps are not necessarily performed sequentially in the order indicated by the arrows. Unless otherwise explicitly specified in this specification, execution of the steps is not strictly limited, and the steps may be performed in other sequences. In addition, at least some steps in FIG. 2, FIG. 7, and FIG. 8, may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Figure 9:
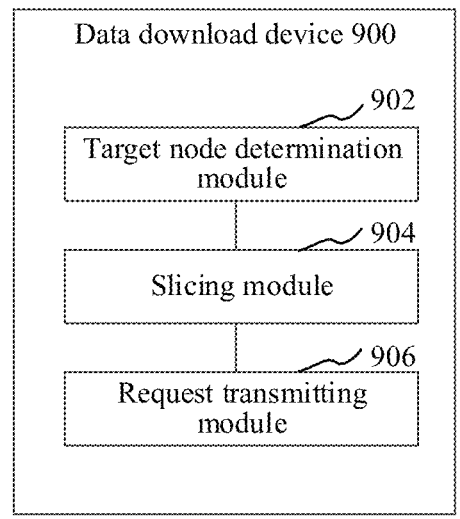
FIG. 9 is a structural block diagram of a data download apparatus in one embodiment.

In one embodiment, as shown in FIG. 9, a data download apparatus 900 is provided, and may adopt a software module or a hardware module, or a combination of the two forms part of a computer device, and the apparatus specifically includes: a target node determination module 902, a slicing module 904, and a request transmitting module 906.

The target node determination module 902 is configured to query fog node information of at least one fog node corresponding to target data upon receiving a data download request for the target data, the fog node information at least including a communication protocol type of the fog node, and determine a target fog node from the at least one fog node based on the fog node information.

The slicing module 904 is configured to slice the target data to be downloaded according to the communication protocol type of the target fog node to obtain slice information of the data slice to be downloaded.

The request transmitting module 906 is configured to transmit a slice download request to a target fog node corresponding to the data slice to be downloaded based on the slice information of the data slice to be downloaded, and obtain the target data by combining the data slice returned by each target fog node in response to the corresponding slice download request.

Figure 10:
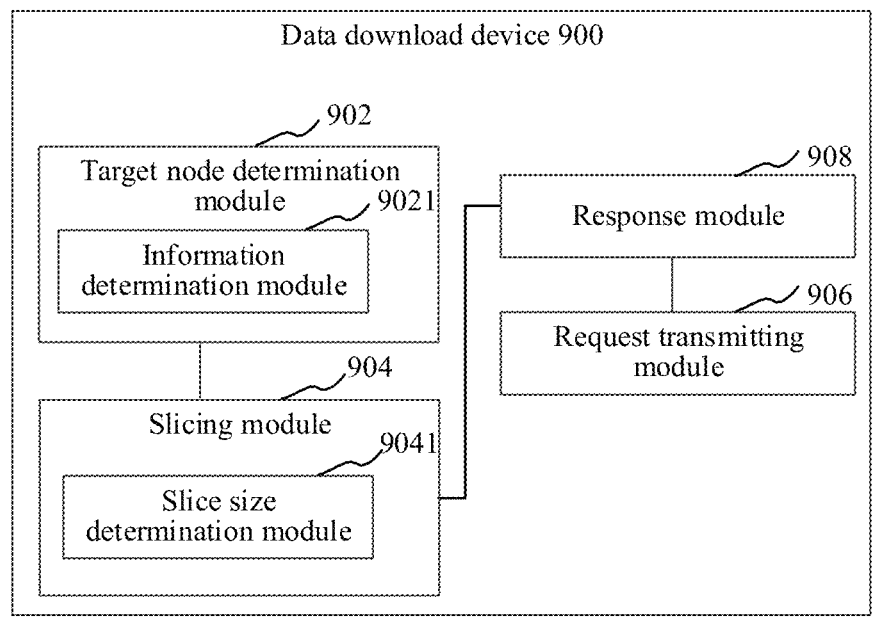
FIG. 10 is a structural block diagram of a data download apparatus in one embodiment.

In one embodiment, referring to FIG. 10, the fog node information further includes available resource information of the fog node, and the target node determination module 902 further includes an information determination module 9021 configured to determine a fog node set corresponding to the target data according to a data identifier of the target data upon receiving the data download request for the target data, acquire available resource information of each fog node in the fog node set, establish a penetration connection with each fog node in the fog node set, and determine a communication protocol type of each fog node in the fog node set according to the penetration connection.

In one embodiment, the data download apparatus 900 is further configured to determine a slice size of the data slice to be downloaded according to the communication protocol type of the target fog node, and slice the target data to be downloaded according to the slice size to obtain the slice information of a data slice to be downloaded.

In one embodiment, the data download apparatus 900 is further configured to select a current target fog node from at least one fog node according to the communication protocol type, the available resource information and the single node download concurrency, determine a target slice size for slicing according to the communication protocol type of the current target fog node, slice the target data to be downloaded based on the target slice size to obtain the slice information of the current data slice to be downloaded, and transmit a slice download request to the current target fog node based on the slice information of the current data slice to be downloaded to download the current data slice to be downloaded.

In one embodiment, the data download apparatus 900 is further configured to update fog node information of the current target fog node, enter a process of downloading the data slice based on a next target fog node, and perform the operation of selecting a current target fog node from the at least one fog node according to the communication protocol type, the available resource information and the single node download concurrency until all the data slices to be downloaded corresponding to a target file are downloaded.

In one embodiment, the target node determination module 902 is further configured to select a fog node using the communication protocol type being the bilateral reliable communication protocol type, and having the available resources satisfying a preset idle condition and a single node download concurrency being less than a number threshold value from the at least one fog node, and determine the selected fog node as the current target fog node.

In one embodiment, the slicing module 904 further includes a slicing size determination module 9041, configured to determine the target slice size for slicing based on a first target value when the communication protocol of the current target fog node is the bilateral reliable communication protocol type, and determine the target slice size for slicing based on a second target value when the communication protocol of the current target fog node is the connectionless communication protocol type, the second target value being different from the first target value.

In one embodiment, the data download apparatus 900 is further configured to determine at least one target fog node from the fog nodes based on the fog node information, slice the target data to be downloaded according to the communication protocol type corresponding to each target fog node to obtain slice information of at least one data slice to be downloaded, and transmit a slice download request to a target fog node corresponding to each of the data slices to be downloaded based on the slice information of each of the data slices to be downloaded.

In one embodiment, the slicing module 904 is further configured to generate a slice download request corresponding to each of the data slices to be downloaded based on slice information corresponding to each of the data slices to be downloaded, and transmit the slice download request to a target fog node corresponding to each of the data slices to be downloaded in a parallel, the number of the data slices downloaded simultaneously being less than or equal to a preset overall maximum concurrency.

In one embodiment, the data download apparatus 900 is further configured to transmit, by the terminal, the slice download request to the target fog node corresponding to the data slice to be downloaded via the bilateral reliable communication protocol or the connectionless communication protocol when the terminal supports the bilateral reliable communication protocol type, and transmit, by the terminal, the slice download request to the target fog node corresponding to the data slice to be downloaded via the connectionless communication protocol when the terminal only supports the connectionless communication protocol type.

In one embodiment, the data slice includes at least one resource data packet, and the data download apparatus 900 further includes a response module 908, configured to determine a resource data packet downloaded from the current target fog node when the communication protocol type of the current target fog node is the target protocol type with regard to each target fog node in a plurality of target fog nodes, and generate a corresponding response message according to the resource data packet, and transmit the response message to the current target fog node, the response message being used for instructing the current target fog node to retransmit the resource data packet not received by the terminal based on the resource data packet already received by the terminal.

In one embodiment, the target protocol type includes an unknown protocol type, and the response module 908 is further configured to suspend transmission of the response message to the current target fog node when the communication protocol type of the current target fog node is updated from the unknown protocol type to the bilateral reliable communication protocol type based on the resource data packet received by the terminal.

In one embodiment, the target protocol type includes an unknown protocol type, and the response module 908 is further configured to continue transmission of the response message to the current target fog node when the communication protocol type of the current target fog node is updated from the unknown protocol type to the connectionless communication protocol type based on the resource data packet received by the terminal.

In one embodiment, the target data is a target video, the data download request is a video download request for the target video initiated by the multimedia playing application, and the data download apparatus 900 is further configured to transmit the target video to the multimedia playing application after the target video is downloaded, and play the target video through the multimedia playing application.

For a specific limitation on the data download apparatus, reference is made to the limitation on the data download method above, and details are not described herein again. The modules in the foregoing data download apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In one embodiment, a computer device is provided. The computer device may be a terminal, and an internal structure diagram thereof may be shown in FIG. 11. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or a wireless manner, and the wireless manner can be implemented by using WIFI, an operator network, NFC, or other technologies. The computer program is executed by the processor to implement a data download method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 11:
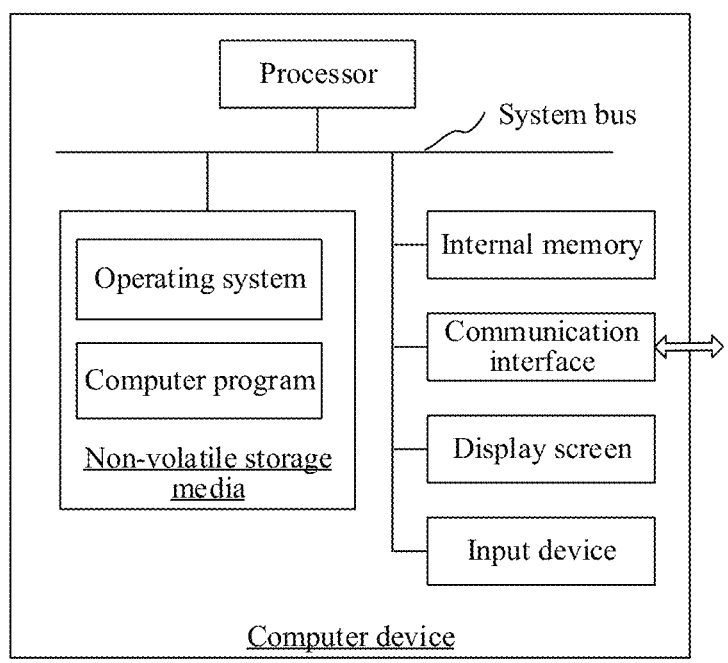
FIG. 11 is an internal structure diagram of a computer device in one embodiment.

A person skilled in the art may understand that the structure shown in FIG. 11 is only a block diagram of a part of a structure related to a solution of this application and does not limit the computer device to which the solution of this application is applied. Specifically, the computer device may include more or fewer components than those in the drawings, or some components are combined, or a different component deployment is used.

In one embodiment, a computer device is further provided, including a memory and a processor, the memory storing a computer program, when executed by the processor, causing the processor to perform the steps in the foregoing method embodiments.

In one embodiment, a computer-readable storage medium is provided, storing a computer program, the computer program, when executed by a processor, implementing the steps in the foregoing method embodiments.

In one embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the above method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

What is claimed is:

1. A data download method, performed by a computer device, the method comprising:
   querying fog node information of a fog node corresponding to target data upon receiving a data download request for the target data, the fog node information comprising a communication protocol type of the fog node;
   identifying a target fog node from the fog node based on the fog node information, wherein the computer device supports a bilateral reliable communication protocol, the target fog node comprises a first fog node supporting the bilateral reliable communication protocol and a second fog node supporting a connectionless communication protocol but not the bilateral reliable communication protocol, and the bilateral reliable communication protocol is compatible with the connectionless communication protocol;
   slicing the target data to be downloaded according to the communication protocol type of the target fog node to obtain slice information of a data slice to be downloaded, comprising:
      selecting the first fog node over the second fog node to determine first slice information of a first data slice to be downloaded corresponding to the first fog node; and
      after a single node download concurrency of the first fog node is reached, selecting the second fog node to determine second slice information of a second data slice to be downloaded;
   transmitting a slice download request to the target fog node corresponding to the data slice to be downloaded based on the slice information of the data slice to be downloaded; and
   obtaining the target data by combining the data slice returned by each target fog node in response to the corresponding slice download request.

2. The method according to claim 1, wherein the fog node information further comprises available resource information of the fog node, and the querying fog node information of a fog node corresponding to target data upon receiving a data download request for the target data comprises:
   determining a fog node set corresponding to the target data according to a data identifier of the target data upon receiving the data download request for the target data, and acquiring available resource information of each fog node in the fog node set;
   establishing a penetration connection with each fog node in the fog node set; and
   determining the communication protocol type of each fog node in the fog node set according to the penetration connection.

3. The method according to claim 1, wherein the slicing the target data to be downloaded according to the communication protocol type of the target fog node to obtain slice information of a data slice to be downloaded comprises:
   determining a slice size of the data slice to be downloaded according to the communication protocol type of the target fog node; and
   slicing the target data to be downloaded according to the slice size to obtain the slice information of the data slice to be downloaded.

4. The method according to claim 1, wherein the fog node information further comprises available resource information of the fog node and the single node download concurrency, and the identifying a target fog node from the fog node based on the fog node information comprises:
   selecting a current target fog node from the fog node according to the communication protocol type, the available resource information and the single node download concurrency;
   the slicing the target data to be downloaded according to the communication protocol type of the target fog node to obtain slice information of a data slice to be downloaded comprises:
   determining a target slice size for slicing according to the communication protocol type of the current target fog node;
   slicing the target data to be downloaded based on the target slice size to obtain the slice information of the current data slice to be downloaded; and
   the transmitting a slice download request to the target fog node corresponding to the data slice to be downloaded based on the slice information of the data slice to be downloaded comprises:
   transmitting the slice download request to the current target fog node based on the slice information of the current data slice to be downloaded to download the current data slice to be downloaded.

5. The method according to claim 4, wherein the method further comprises:
   updating the fog node information of the current target fog node, entering a process of downloading a data slice based on a next target fog node, and selecting a current target fog node from the fog node according to the communication protocol type, the available resource information and the single node download concurrency until all the data slices to be downloaded corresponding to a target file are downloaded.

6. The method according to claim 4, wherein the selecting a current target fog node from the fog node according to the communication protocol type, the available resource information and the single node download concurrency comprises:
   selecting a fog node if a communication protocol type is the bilateral reliable communication protocol type, and having available resources satisfies a pre-set idle condition, and a single node download concurrency is less than a number threshold value from the fog node, and identifying the selected fog node as the current target fog node.

7. The method according to claim 4, wherein the determining a target slice size for slicing according to the communication protocol type of the current target fog node comprises:
   determining the target slice size for slicing based on a first target value when the communication protocol of the current target fog node is the bilateral reliable communication protocol type; and
   determining the target slice size for slicing based on a second target value when the communication protocol of the current target fog node is the connectionless communication protocol type; the second target value being different from the first target value.

8. The method according to claim 1, wherein the identifying a target fog node from the fog node based on the fog node information comprises:
   determining a target fog node from the fog nodes based on the fog node information;
   the slicing the target data to be downloaded according to the communication protocol type of the target fog node to obtain slice information of a data slice to be downloaded comprises:

slicing the target data to be downloaded according to the communication protocol type corresponding to each target fog node to obtain slice information of a data slice to be downloaded; and the transmitting a slice download request to the target fog node corresponding to the data slice to be downloaded based on the slice information of the data slice to be downloaded comprises:

transmitting a slice download request to a target fog node corresponding to each of the data slices to be downloaded based on the slice information of each data slices to be downloaded.

9. The method according to claim 8, wherein the transmitting a slice download request to a target fog node corresponding to each data slice to be downloaded based on the slice information of each data slice to be downloaded comprises:

generating a slice download request corresponding to each data slice to be downloaded based on the slice information corresponding to each data slice to be downloaded; and transmitting the slice download request to the target fog node corresponding to each data slice to be downloaded in a parallel manner, the number of the data slices downloaded simultaneously being less than or equal to a maximum concurrency.

10. The method according to claim 1, wherein the method is performed by a terminal, the communication protocol types comprise the bilateral reliable communication protocol type and the connectionless communication protocol type, and the transmitting a slice download request to the target fog node corresponding to the data slice to be downloaded based on the slice information of the data slice to be downloaded comprises:

transmitting, by the terminal, the slice download request to the target fog node corresponding to the data slice to be downloaded via the bilateral reliable communication protocol or the connectionless communication protocol when the terminal supports the bilateral reliable communication protocol type.

11. The method according to claim 1, wherein the data slice comprises a resource data packet, and the method further comprises:

determining a resource data packet downloaded from the current target fog node when the communication protocol type of the current target fog node is a target protocol type with regard to each target fog node in a plurality of target fog nodes; and generating a corresponding response message according to the resource data packet, and transmitting the response message to the current target fog node, the response message being used for instructing the current target fog node to retransmit a resource data packet not received by the terminal based on the resource data packet already received by the terminal.

12. The method according to claim 9, wherein the target protocol type comprises the unknown protocol type, and the method further comprises:

suspending transmission of the response message to the current target fog node when the communication protocol type of the current target fog node is updated from the unknown protocol type to the bilateral reliable communication protocol type based on the resource data packet received by the terminal.

13. The method according to claim 9, wherein the target protocol type comprises the unknown protocol type, and the method further comprises:

continuing transmission of the response message to the current target fog node when the communication protocol type of the current target fog node is updated from the unknown protocol type to the connectionless communication protocol type based on the resource data packet received by the terminal.

14. The method according to claim 1, wherein the target data is a target video, the data download request is a video download request for the target video initiated by a multimedia playing application, and the method further comprises:

transmitting the target video to the multimedia playing application after the target video is downloaded; and playing the target video through the multimedia playing application.

15. A computer device, comprising a memory and a processor, the memory storing a computer program, and the processor, when executing the computer program, implementing operations comprising:

querying fog node information of a fog node corresponding to target data upon receiving a data download request for the target data, the fog node information comprising a communication protocol type of the fog node;

identifying a target fog node from the fog node based on the fog node information, wherein the computer device supports a bilateral reliable communication protocol, the target fog node comprises a first fog node supporting the bilateral reliable communication protocol and a second fog node supporting a connectionless communication protocol but not the bilateral reliable communication protocol, and the bilateral reliable communication protocol is compatible with the connectionless communication protocol;

slicing the target data to be downloaded according to the communication protocol type of the target fog node to obtain slice information of a data slice to be downloaded, comprising:

selecting the first fog node over the second fog node to determine first slice information of a first data slice to be downloaded corresponding to the first fog node; and after a single node download concurrency of the first fog node is reached, selecting the second fog node to determine second slice information of a second data slice to be downloaded;

transmitting a slice download request to the target fog node corresponding to the data slice to be downloaded based on the slice information of the data slice to be downloaded; and obtaining the target data by combining the data slice returned by each target fog node in response to the corresponding slice download request.

16. The computer device according to claim 15, wherein the fog node information further comprises available resource information of the fog node, and the querying fog node information of a fog node corresponding to target data upon receiving a data download request for the target data comprises:

determining a fog node set corresponding to the target data according to a data identifier of the target data upon receiving the data download request for the target data, and acquiring available resource information of each fog node in the fog node set;

establishing a penetration connection with each fog node in the fog node set; and determining the communication protocol type of each fog node in the fog node set according to the penetration connection.

17. The computer device according to claim 15, wherein the slicing the target data to be downloaded according to the communication protocol type of the target fog node to obtain slice information of a data slice to be downloaded comprises:
determining a slice size of the data slice to be downloaded according to the communication protocol type of the target fog node; and
slicing the target data to be downloaded according to the slice size to obtain the slice information of the data slice to be downloaded.

18. The computer device according to claim 15, wherein the fog node information further comprises available resource information of the fog node and the single node download concurrency, and the identifying a target fog node from the fog node based on the fog node information comprises:
selecting a current target fog node from the fog node according to the communication protocol type, the available resource information and the single node download concurrency;
the slicing the target data to be downloaded according to the communication protocol type of the target fog node to obtain slice information of a data slice to be downloaded comprises:
determining a target slice size for slicing according to the communication protocol type of the current target fog node;
slicing the target data to be downloaded based on the target slice size to obtain the slice information of the current data slice to be downloaded; and
the transmitting a slice download request to the target fog node corresponding to the data slice to be downloaded based on the slice information of the data slice to be downloaded comprises:
transmitting the slice download request to the current target fog node based on the slice information of the current data slice to be downloaded to download the current data slice to be downloaded.

19. A non-transitory computer-readable storage medium, storing a computer program, the computer program, when executed by a processor, causing the processor to implement operations comprising:
querying fog node information of a fog node corresponding to target data upon receiving a data download request for the target data, the fog node information comprising a communication protocol type of the fog node;
identifying a target fog node from the fog node based on the fog node information, wherein the computer device supports a bilateral reliable communication protocol, the target fog node comprises a first fog node supporting the bilateral reliable communication protocol and a second fog node supporting a connectionless communication protocol but not the bilateral reliable communication protocol, and the bilateral reliable communication protocol is compatible with the connectionless communication protocol;
slicing the target data to be downloaded according to the communication protocol type of the target fog node to obtain slice information of a data slice to be downloaded, comprising:
selecting the first fog node over the second fog node to determine first slice information of a first data slice to be downloaded corresponding to the first fog node; and
after a single node download concurrency of the first fog node is reached, selecting the second fog node to determine second slice information of a second data slice to be downloaded;
transmitting a slice download request to the target fog node corresponding to the data slice to be downloaded based on the slice information of the data slice to be downloaded; and
obtaining the target data by combining the data slice returned by each target fog node in response to the corresponding slice download request.

20. The computer-readable storage medium according to claim 19, wherein the identifying a target fog node from the fog node based on the fog node information comprises:
determining the target fog node from the fog nodes based on the fog node information;
the slicing the target data to be downloaded according to the communication protocol type of the target fog node to obtain slice information of a data slice to be downloaded comprises:
slicing the target data to be downloaded according to the communication protocol type corresponding to each target fog node to obtain slice information of a data slice to be downloaded; and
the transmitting a slice download request to the target fog node corresponding to the data slice to be downloaded based on the slice information of the data slice to be downloaded comprises:
transmitting the slice download request to a target fog node corresponding to each of the data slices to be downloaded based on the slice information of each data slices to be downloaded.

* * * * *